(12) United States Patent
Lu et al.

(10) Patent No.: US 11,876,551 B2
(45) Date of Patent: Jan. 16, 2024

(54) ELECTRONIC MODULE

(71) Applicant: Advanced Semiconductor Engineering, Inc., Kaohsiung (TW)

(72) Inventors: Shih-Wen Lu, Kaohsiung (TW); Chun-Jen Chen, Kaohsiung (TW); Po-Hsiang Tseng, Kaohsiung (TW); Hsin-Han Lin, Kaohsiung (TW); Ming-Lun Yu, Kaohsiung (TW)

(73) Assignee: ADVANCED SEMICONDUCTOR ENGINEERING, INC., Kaohsiung (TW)

(*) Notice: Subject to any disclaimer, the term of this patent is extended or adjusted under 35 U.S.C. 154(b) by 0 days.

(21) Appl. No.: 17/407,067

(22) Filed: Aug. 19, 2021

(65) Prior Publication Data
US 2023/0057327 A1 Feb. 23, 2023

(51) Int. Cl.
| | |
|---|---|
| H04B 1/525 | (2015.01) |
| H04B 1/04 | (2006.01) |
| H04B 1/48 | (2006.01) |
| H04B 1/10 | (2006.01) |

(52) U.S. Cl.
CPC ........... *H04B 1/525* (2013.01); *H04B 1/0475* (2013.01); *H04B 1/1009* (2013.01); *H04B 1/48* (2013.01); *H04B 2001/485* (2013.01)

(58) Field of Classification Search
CPC .... H04B 1/525; H04B 1/0475; H04B 1/1009; H04B 1/48; H04B 2001/485
See application file for complete search history.

(56) References Cited

U.S. PATENT DOCUMENTS

| | | | |
|---|---|---|---|
| 6,472,952 B1* | 10/2002 | Sakai | H04B 1/50 333/126 |
| 2005/0136850 A1* | 6/2005 | Arai | H01L 23/552 455/88 |
| 2013/0043961 A1* | 2/2013 | Gebauer | H03H 9/0566 333/133 |
| 2016/0142041 A1* | 5/2016 | Kuwahara | H03H 9/0514 333/195 |
| 2016/0381687 A1* | 12/2016 | Yang | H03H 7/40 370/281 |
| 2019/0029109 A1* | 1/2019 | Uejima | H04B 1/525 |
| 2021/0152195 A1* | 5/2021 | Uejima | H04B 1/0067 |
| 2022/0238525 A1* | 7/2022 | Kunitake | H01L 29/78696 |

\* cited by examiner

*Primary Examiner* — Nguyen T Vo
(74) *Attorney, Agent, or Firm* — FOLEY & LARDNER LLP

(57) ABSTRACT

The present disclosure provides an electronic module including a circuit including a transmitting part and a receiving part physically separated from the transmitting part. The electronic module also includes an element isolated from the circuit and configured to block electrical interference between the transmitting part and the receiving part.

19 Claims, 8 Drawing Sheets

ELECTRONIC MODULE

BACKGROUND

1. Technical Field

The present disclosure relates generally to an electronic module, and more particularly to an electronic module used in wireless communications.

2. Description of the Related Art

In full-duplex communication technology, duplexing devices are commonly used in wireless communication equipment to allow multi-directional signal communication over a single path at any given time. The duplexing device isolates the transmitting part (TX) and the receiving part (RX) and allows the TX and RX to use the same antenna.

As wireless communication equipment becomes more compact (or when more devices are incorporated in a same wireless communication equipment), the TX and RX may be disposed in close proximity. Undesirable interference when operating the TX and RX simultaneously presents a problem.

SUMMARY

In some arrangements, an electronic module includes a circuit including a transmitting part and a receiving part physically separated from the transmitting part. The electronic module also includes an element isolated from the circuit and configured to block electrical interference between the transmitting part and the receiving part.

In some arrangements, an electronic module includes a supporting element including a first surface and a second surface opposite to the first surface. The electronic module also includes a transmitting part supported by the first surface of the supporting element and a receiving part supported by the second surface of the supporting element. The electronic module also includes an antenna part adjacent to the receiving part and configured to receive a first signal from the transmitting part and configured to transmit a second signal to the receiving part.

In some arrangements, an electronic module includes a first carrier, a second carrier physically separated from the first carrier, and a duplexing device including a transmitting part adjacent to the first carrier and a receiving part adjacent to the second carrier.

BRIEF DESCRIPTION OF THE DRAWINGS

Aspects of the present disclosure are readily understood from the following detailed description when read with the accompanying figures. It should be noted that various features may not be drawn to scale. The dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
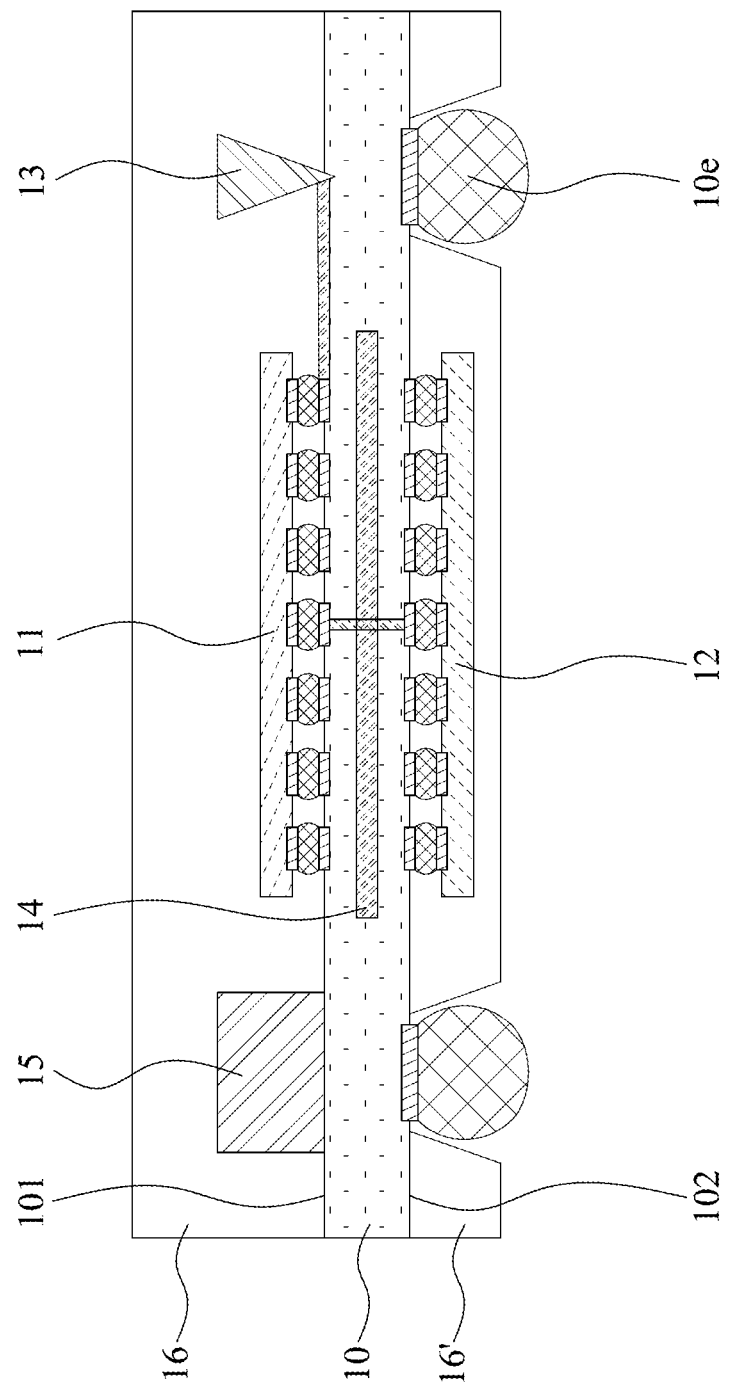
FIG. 1 illustrates a cross-sectional view of an electronic module in accordance with some arrangements of the present disclosure.

The following disclosure provides many different arrangements, or examples, for implementing different features of the provided subject matter. Specific examples of components and arrangements are described below. These are, of course, merely examples and are not intended to be limiting. In the present disclosure, reference to the formation of a first feature over or on a second feature in the description that follows may include arrangements in which the first and second features are formed in direct contact, and may also include arrangements in which additional features may be formed between the first and second features, such that the first and second features may not be in direct contact. Besides, the present disclosure may repeat reference numerals and/or letters in the various examples. This repetition is for simplicity and clarity and does not in itself dictate a relationship between the various arrangements and/or configurations discussed.

Arrangements of the present disclosure are discussed in detail below. It should be appreciated, however, that the present disclosure provides many applicable concepts that can be embodied in a wide variety of specific contexts. The specific arrangements discussed are merely illustrative and do not limit the scope of the disclosure.

FIG. 1 illustrates a cross-sectional view of an electronic module 1 in accordance with some arrangements of the present disclosure. In some arrangements, the electronic module 1 may be or include a duplexing device used in wireless communications. In some arrangements, the electronic module 1 may include a substrate 10, a receiving part 11, a transmitting part 12, an antenna part 13, a shielding structure 14, a controlling device 15, and encapsulants 16, 16'. In some arrangements, the electronic module 1 may include a semiconductor device or a semiconductor device package.

In some arrangements, the substrate 10 may be or include, for example, a printed circuit board (PCB) (such as a paper-based copper foil laminate), a composite copper foil laminate, a polymer-impregnated glass-fiber-based copper foil laminate, or so on. The substrate 10 may have a surface 101 and a surface 102 opposite to the surface 101. In some arrangements, the substrate 10 may include a redistribution layer (RDL), a grounding element, a feeding line, a conductive transmission line, or other conductive structures. In some arrangements, the substrate 10 may include an electrical contact 10e on the surface 102 for providing electrical connections between the electronic module 1 and an external device (e.g., a PCB, an electronic device, another electronic module, and so on). The electrical contact 10e may include a solder ball, such as a controlled collapse chip connection (C4) bump, a ball grid array (BGA) or a land grid array (LGA). In some arrangements, the substrate 10 may include one or more supporting elements or one or more carrier configured to support the receiving part 11, the transmitting part 12, and the antenna part 13.

In some arrangements, each of the receiving part 11, the transmitting part 12, and the antenna part 13 may be a chip or a die including a semiconductor substrate, one or more integrated circuit devices, and one or more overlying interconnection structures therein. The integrated circuit devices may include active devices such as transistors and/or passive devices such as resistors, capacitors, inductors, or a combination thereof.

In some arrangements, each of the receiving part 11, the transmitting part 12, and the antenna part 13 may be a path or a port. In some arrangements, the receiving part 11 may be connected with a receiver or a receiving part of a transceiver (such as the receiving part RX of the transceiver 21 in FIG. 2). In some arrangements, the transmitting part 12 may be connected with a transmitter or a transmitting part of a transceiver (such as the transmitting part TX of the transceiver 21 in FIG. 2). In some arrangements, the antenna part 13 may be connected with an antenna (such as the antenna 22 in FIG. 2).

In some arrangements, one or more of the receiving part 11, the transmitting part 12, and the antenna part 13 may be partially embedded in the substrate 10. In some arrangements, one or more of the receiving part 11, the transmitting part 12, and the antenna part 13 may be partially exposed from the substrate 10 as shown. In other arrangements, one or more of the receiving part 11, the transmitting part 12, and the antenna part 13 may be entirely embedded in the substrate 10, such that no part of one or more of the receiving part 11, the transmitting part 12, and the antenna part 13 is exposed from the substrate 10.

In some arrangements, the receiving part 11 may be disposed on the surface 101 of the substrate 10. In some arrangements, the receiving part 11 may be adjacent to the surface 101 of the substrate 10. In some arrangements, the receiving part 11 and the transmitting part 12 may be disposed on opposite sides of the substrate 10. For example, the transmitting part 12 may be disposed on the surface 102 of the substrate 10. For example, the transmitting part 12 may be adjacent to the surface 102 of the substrate 10. In some arrangements, the receiving part 11 and the transmitting part 12 may be physically spaced apart with a gap therebetween. In some arrangements, the receiving part 11 may be physically separated from the transmitting part 12. For example, the receiving part 11 and the transmitting part 12 may be separated by the substrate 10 as shown. In other arrangements, the receiving part 11 and the transmitting part 12 may be disposed on the same side of the substrate 10 (for example, as described in FIGS. 4, 5, 6, and 7). For example, the receiving part 11 and the transmitting part 12 may be disposed side-by-side on the surface 101 or the surface 102. In the arrangements in which the receiving part 11 and the transmitting part 12 are disposed on the same side of the substrate 10, the receiving part 11 may be physically separated from and spaced apart with the transmitting part 12 with a gap therebetween.

Figure 5:
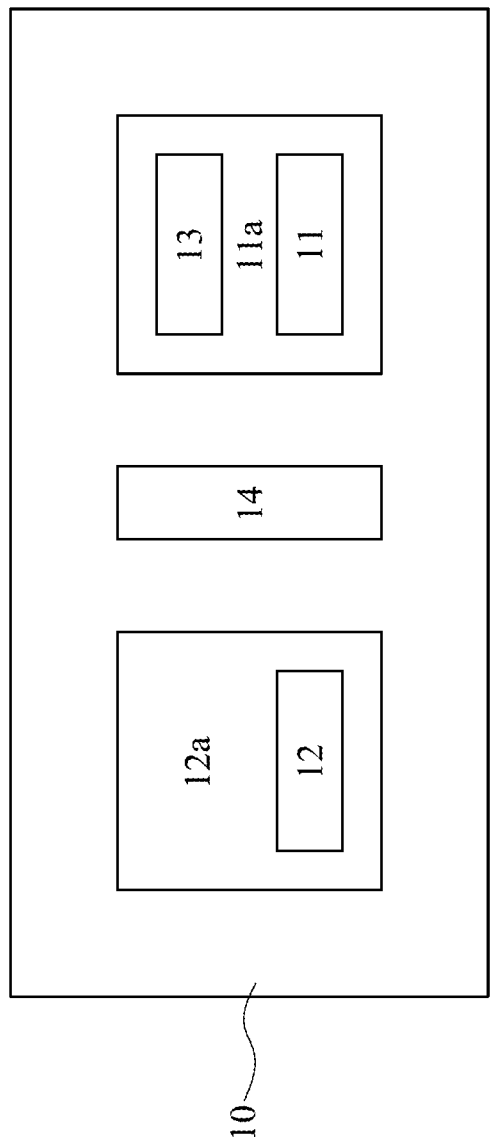
FIG. 5 illustrates a top view of an electronic module in accordance with some arrangements of the present disclosure.

In some arrangements, the antenna part 13 and the receiving part 11 may be disposed on the same side of the substrate 10. For example, the antenna part 13 may be disposed on the surface 101 of the substrate 10. In some arrangements, the antenna part 13 and the receiving part 11 may be integrated. For example, the antenna part 13 and the receiving part 11 may be integrated on the surface 101 of the substrate 10. For example, the antenna part 13 and the receiving part 11 may be integrated on the same carrier. For example, as shown in FIG. 5, the antenna part 13 and the receiving part 11 may be integrated on (e.g., embedded in, contacting, coupled to, attached to, and so on) the same carrier 11a. The carrier 11a may be a part of the substrate 10 or may be a carrier physically separated from the substrate 10.

In some arrangements, the receiving part 11, the transmitting part 12, and the antenna part 13 may be electrically connected through the substrate 10. For example, the receiving part 11, the transmitting part 12, and the antenna part 13 may be electrically connected through a conductive transmission line (not shown), such as a microstrip line in the substrate 10.

In some arrangements, the receiving part 11 and the transmitting part 12 may be configured to conduct electronic signals having a substantially same frequency and/or bandwidth. In some arrangements, the receiving part 11 and the transmitting part 12 may be configured to conduct electronic signals having different frequencies or bandwidths. In some arrangements, the transmitting part 12 and the receiving part 11 may use the same antenna part 13. For example, wireless transmission and the reception of the electromagnetic waves may be performed through the same antenna part 13.

In some arrangements, the shielding structure 14 may be disposed between the receiving part 11 and the transmitting part 12. In some arrangements, the shielding structure 14 may extend in a direction substantially parallel to the surface 101 and/or the surface 102 of the substrate 10. In some arrangements, the shielding structure 14 may be stacked on the transmitting part 12. In some arrangements, the receiving part 11 may be stacked on the shielding structure 14. In some arrangements, the shielding structure 14 may be configured to prevent electromagnetic interference (EMI) between the receiving part 11 and the transmitting part 12. In some arrangements, the shielding structure 14 may be configured to block electrical interference between the receiving part 11 and the transmitting part 12. In some arrangements, the shielding structure 14 may be disposed within the substrate 10 as shown. In some arrangements, the shielding structure 14 may include a grounding element or a grounding layer in the substrate 10. For example, the grounding layer in the substrate 10 may function to prevent EMI and block electrical interference between the receiving part 11 and the transmitting part 12. In some arrangements, the shielding structure 14 may include be any number of grounding layer in the substrate 10. In some arrangements, the shielding structure 14 may include an element isolated from the receiving part 11 and the transmitting part 12. In other words, the shielding structure 14 may be not electrically connected to either the receiving part 11 or the transmitting part 12.

Figure 8:
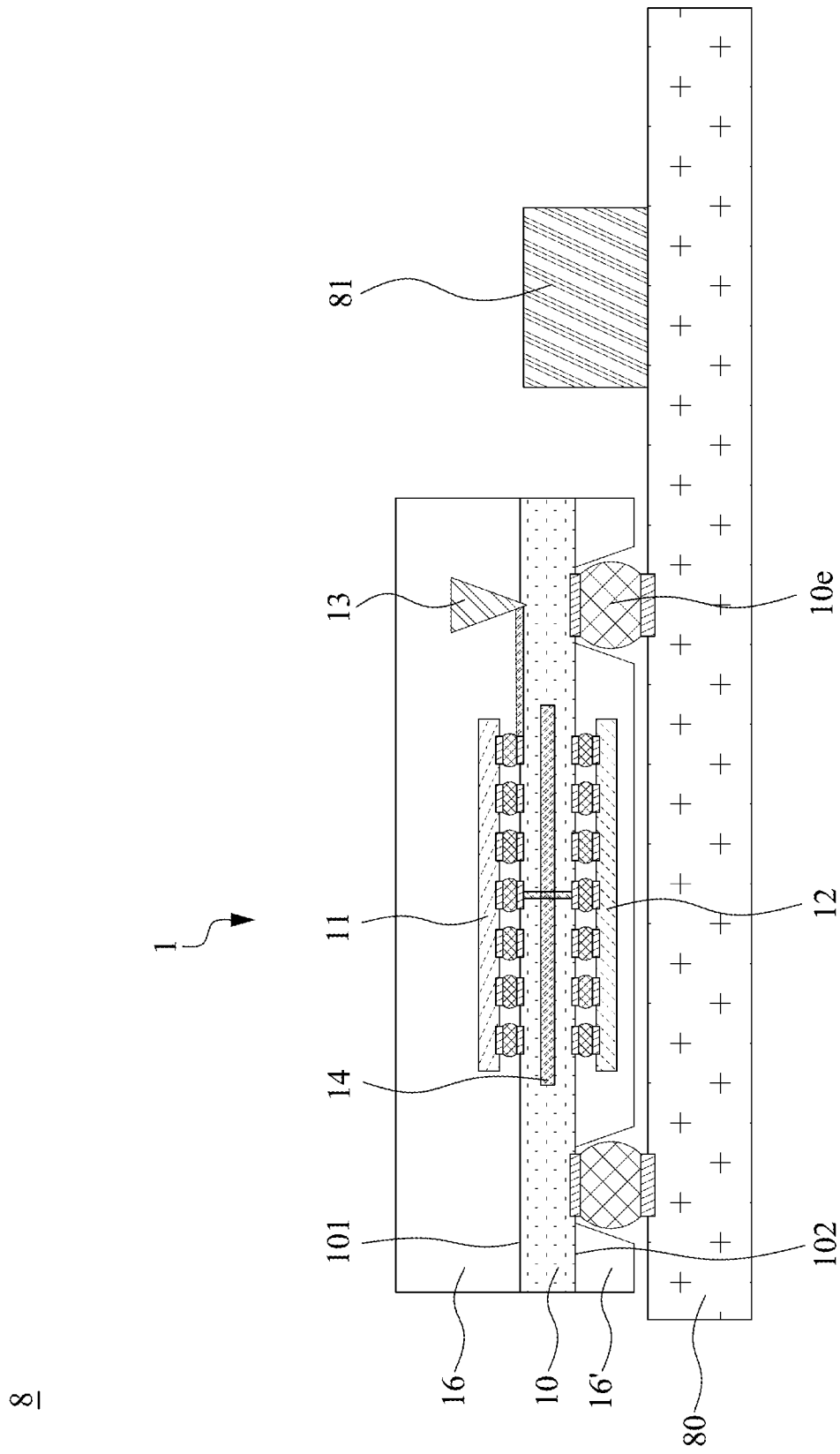
FIG. 8 illustrates a cross-sectional view of an electronic module in accordance with some arrangements of the present disclosure.

In some arrangements, the controlling device 15 may be disposed on the surface 101 of the substrate 10. In some other arrangements, the controlling device 15 may be disposed on the surface 102 of the substrate 10. In some other arrangements, the controlling device 15 may be disposed outside of the electronic module 1 (as shown in FIG. 8).

In some arrangements, the controlling device 15 may be electrically connected to the substrate 10 (e.g., to the conductive structures thereof) by flip-chip or wire-bonding. In some arrangements, the controlling device 15 may be electrically connected to the receiving part 11 through the substrate 10. For example, the controlling device 15 may be electrically connected to the receiving part 11 through a conductive transmission line, such as a microstrip line in the substrate 10. In some arrangements, the controlling device 15 may be electrically connected to the transmitting part 12 through the substrate 10. For example, the controlling device 15 may be electrically connected to the transmitting part 12 through a conductive transmission line, such as a microstrip line in the substrate 10.

In some arrangements, the controlling device 15 may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some arrangements, the controlling device 15 may be configured to control the conduction of the electronic signals of the transmitting part 12 and the receiving part 11, further described in FIG. 2.

In some arrangements, the encapsulant 16 may be disposed on the surface 101 of the substrate 10 and covers or surrounds the components located on or adjacent to the surface 101 of the substrate 10, including the receiving part 11, the antenna part 13, and the controlling device 15 as shown. In some arrangements, the encapsulant 16' may be disposed on the surface 102 of the substrate 10 and covers or surrounds the components located on or adjacent to the surface 102, including the transmitting part 12 as shown. In some arrangements, the encapsulant 16 and/or the encapsulant 16' may be physically isolated from the shielding structure 14. For example, the encapsulant 16 and/or the encapsulant 16' may be physically isolated or separate from the shielding structure 14 by the substrate 10, such that the substrate 10 is between the shielding structure 14 and the encapsulants 16 and/or 16'. In some arrangements, the antenna part 13 may be at least partially exposed from the encapsulant 16. In some arrangements, the electrical contact 10e may be at least partially exposed from the encapsulant 16'. In an example, as shown, the electrical contact 10e is exposed in a concave space defined by the encapsulant 16'. In other arrangements, the encapsulant 16 and/or the encapsulant 16' may be omitted.

In some arrangements, each of the encapsulant 16 and the encapsulant 16' may include an epoxy resin having fillers, a molding compound (e.g., an epoxy molding compound or other molding compound), a polyimide, a phenolic compound or material, a material with a silicone dispersed therein, or a combination thereof.

Figure 2:
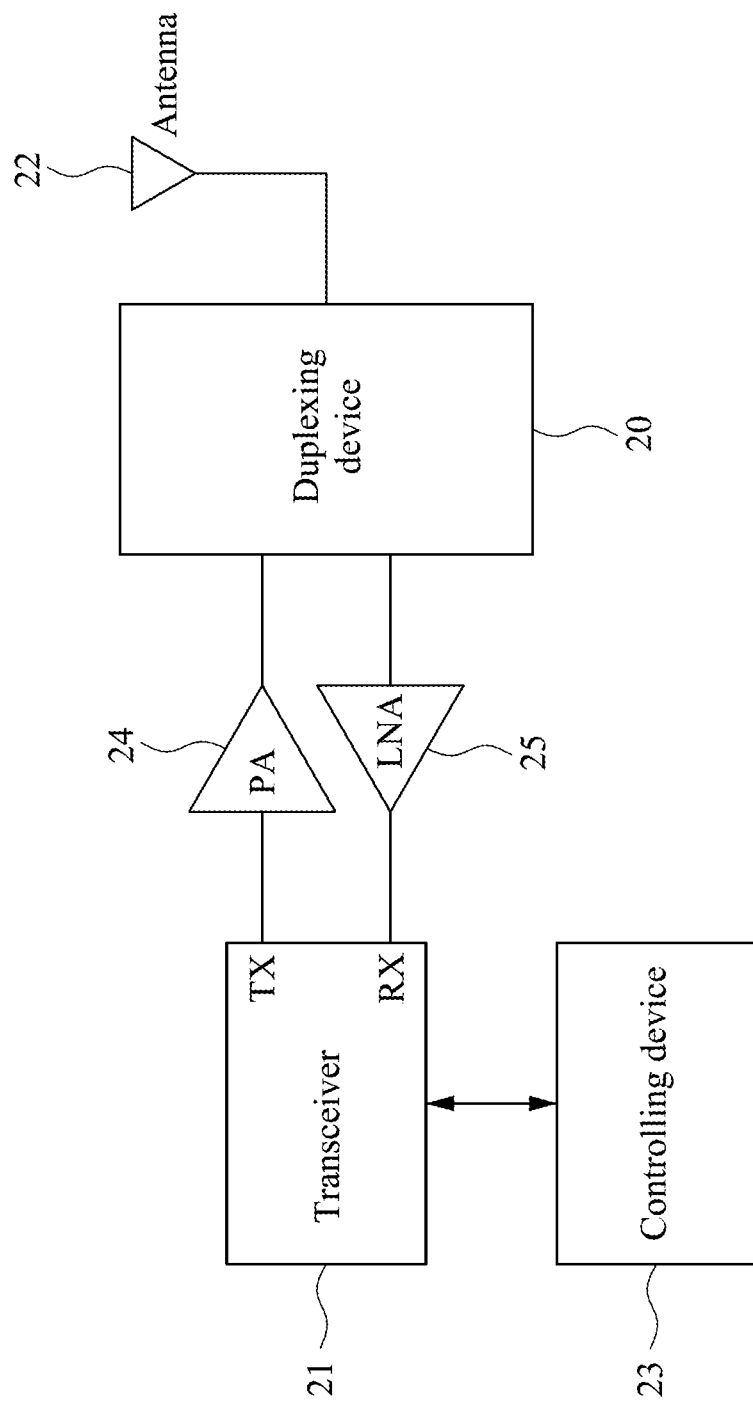
FIG. 2 illustrates a functional block diagram of an electronic module in accordance with some arrangements of the present disclosure.

FIG. 2 illustrates a functional block diagram of an electronic module in accordance with some arrangements of the present disclosure. In some arrangements, the function of the electronic module 1 in FIG. 1 may be a part of the functional block diagram in FIG. 2. The functional block diagram may include a duplexing device 20, a transceiver 21, an antenna 22, and a controlling device 23. In some arrangements, an example of the duplexing device 20 is the electronic module 1 in FIG. 1.

The transceiver 21 may have a transmitting part TX connected to a port (such as the transmitting part 12 of the electronic module 1) of the duplexing device 20 through a power amplifier (PA) 24. In some arrangements, the transmitting part TX may be configured to output an electronic signal (such as a transmission signal) to the duplexing device 20. The electronic signal may be conducted through the PA 24 and a transmission path (such as the transmitting part 12 of the electronic module 1). The transceiver 21 may have a receiving part RX connected to a port (such as the receiving part 11 of the electronic module 1) of the duplexing device 20 through a low-noise amplifier (LNA) 25. In some arrangements, the receiving part RX may be configured to receive an electronic signal (such as a reception signal) from the duplexing device 20. The electronic signal may be conducted through a reception path (such as the receiving part 11 of the electronic module 1) and the LNA 25. In some arrangements, the electronic signals in the transmission path and the reception path may have a substantially same frequency and/or bandwidth. In some arrangements, the electronic signals in the transmission path and the reception path may have different frequencies and/or bandwidths. In some arrangements, the transceiver 21 may include a combination of a transmitter and a receiver. In some arrangements, the transceiver 21 may include a transmitter and a receiver physically separated from each other.

The antenna 22 may be connected to a port (such as the antenna part 13) of the duplexing device 20. In some arrangements, the antenna 22 may include a patch antenna, a chip antenna, an inverted-F antennas, or so on. In some arrangements, the antenna 22 may be configured to emit a transmission signal from the transmitting part TX in the form of electromagnetic waves and catch or require a desired reception signal out of electromagnetic waves. The receiving part RX and the transmitting part TX of the transceiver 21 may not directly connect to the antenna 22. The receiving part RX and the transmitting part TX of the transceiver 21 may connect to the antenna 22 through the duplexing device 20. In other words, the receiving part RX and the transmitting part TX may connect to the antenna 22 through a circuit including the receiving part 11, the transmitting part 12, and the antenna part 13 in FIG. 1. The receiving part RX and the transmitting part TX may use the same antenna 22. For example, the transmission and the reception of the electromagnetic waves may be conducted through the same antenna 22.

The controlling device 23 may connect to each of the duplexing device 20, the transceiver 21, and the antenna 22. In some arrangements, the controlling device 23 may be configured to control the duplexing device 20. For example, the controlling device 23 may generate a control signal to control the duplexing device 20. In some arrangements, the controlling device 23 may be configured to control the transmission and the reception of the electromagnetic waves.

The duplexing device 20 may have three ports connected with the transmitting part TX, the receiving part RX, and the antenna 22. In some arrangements, the duplexing device 20 may be the circuit between the transmitting part TX, the receiving part RX, and the antenna 22. In some arrangements, the duplexing device 20 may be responsive to a control signal generated from the controlling device 23.

In some arrangements, the electronic signals from the PA 24 to the antenna 22 through the duplexing device 20 (such as through the transmitting part 12 of the electronic module 1 in FIG. 1) and the electronic signals from the antenna 22 to the LNA 25 through the duplexing device 20 (such as through the receiving part 11 of the electronic module 1 in FIG. 1) may be substantially conducted at the same time without interfering with each other. In some arrangements, the duplexing device 20 may be configured to allow multi-directional signal communication (e.g., for transmission and reception) over a single path. For example, in the duplexing device 20, a first path is configured to conduct a first electronic signal from the transmitting part TX to the antenna 22 and a second path is configured to conduct a second electronic signal from the antenna 22 to the receiving part RX. In some arrangements, the first signal and the second signal may be conducted at the same time. In some arrangements, the frequency of the first signal and the frequency of the second signal may be substantially the same. In some arrangements, the duplexing device 20 may be configured to perform a full duplex operation. In some arrangements, the duplexing device 20 may include a circulator. In some arrangements, the duplexing device 20 may have a circuit that functions as a circulator.

For example, the controlling device 23 may be configured to generate a control signal to control the duplexing device 20 to allow multi-directional signal communication over a single path. For example, the controlling device 23 may be configured to generate a control signal to control the duplexing device 20 to perform a full duplex operation. For example, the controlling device 23 may be configured to generate a control signal to control the duplexing device 20 to function as a circulator.

For example, the controlling device 23 may be configured to provide a single path from the transmitting part TX to the antenna 22 through the duplexing device 20.

For example, the controlling device 23 may be configured to provide a single path from the receiving part RX to the transmitting part TX through the duplexing device 20.

For example, the controlling device 23 may be configured to prevent a direct path from the transmitting part TX to the receiving part RX through the duplexing device 20.

For example, the controlling device 23 may be configured to control the duplexing device 20 to route signals from the transmitting part TX to the antenna 22 and from the antenna 22 to the receiving part RX, without allowing signals to pass directly from the transmitting part TX to the receiving part RX.

In some other arrangements, the controlling device 23 may be omitted. For example, the electronic signals from the PA 24 to the antenna 22 through the duplexing device 20 and the electronic signals from the antenna 22 to the LNA 25 through the duplexing device 20 may be substantially conducted at the same time without interfering with each other with or without the controlling device 23. For example, the duplexing device 20 may be configured to allow multi-directional signal communication (e.g., for transmission and reception) over a single path with or without the controlling device 23.

In an example, to enhance degree of isolation between the transmitting part TX and the receiving part RX, a circulator may be inserted, such as between the PA 24 and the duplexing device 20. However, such an additional circulator may increase the weight and the cost and may further increase insertion loss from the transmitting part TX to the antenna 22 and/or from the antenna 22 to the receiving part RX.

According to some arrangements of the present disclosure, the transmitting part and the receiving part of the duplexing device 200 are integrated in (e.g., embedded in, contacting, coupled to, attached to, and so on) an electronic module and isolated by a shielding structure. For example, in FIG. 1, the transmitting part 12 and the receiving part 11 are integrated in the electronic module 1 and are isolated by the shielding structure 14. The package size of the electronic module 1 may be reduced.

The degree of isolation between the transmitting part TX and the receiving part RX (e.g., the transmitting part 12 and the receiving part 11) may be enhanced. For example, self-interference in full-duplex communication may be alleviated or eliminated. In addition, the shielding structure (e.g., the shielding structure 14) provides simpler and cheaper isolation than the addition of another circulator. Low insertion loss from the transmitting part TX of the transceiver 21 to the antenna 22 and/or from the antenna 22 to the receiving part RX of the transceiver 21 may be achieved while providing high isolation from the transmitting part TX to the receiving part RX.

Figure 3:
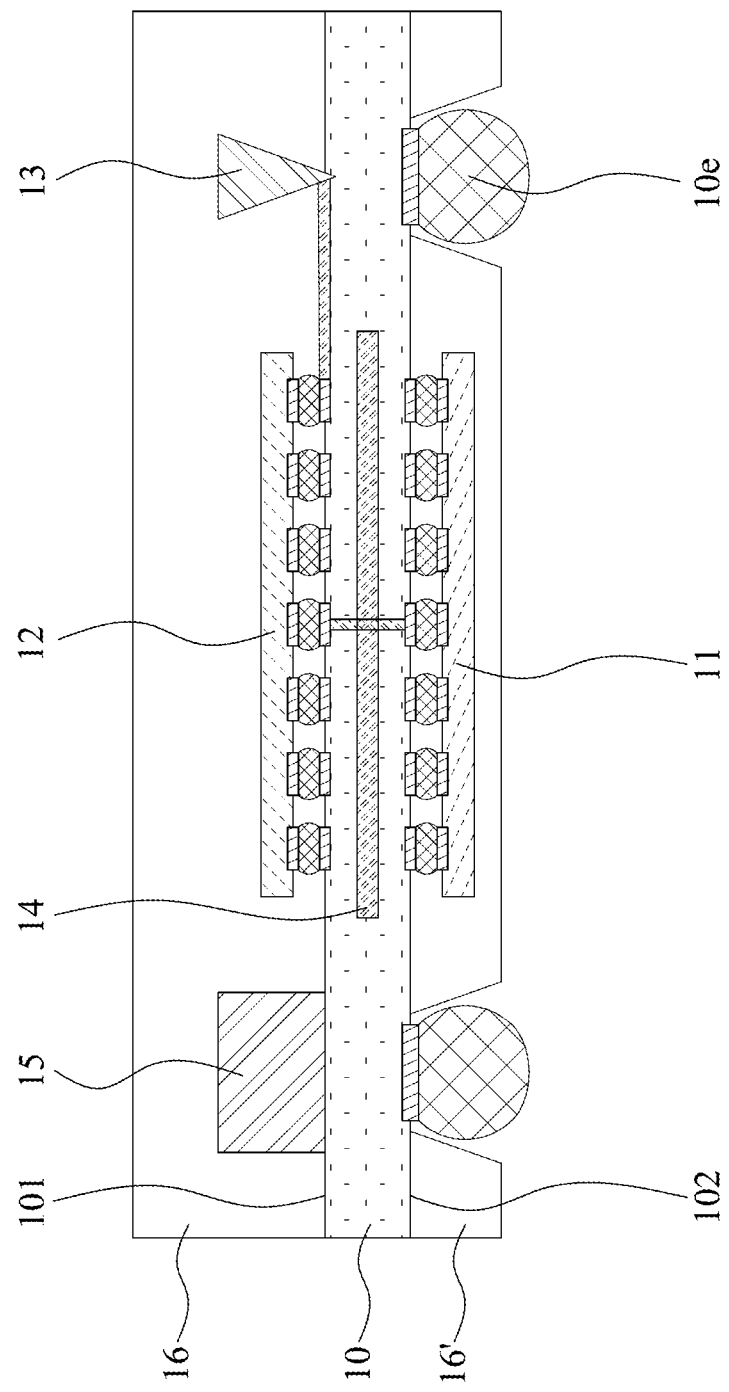
FIG. 3 illustrates a cross-sectional view of an electronic module in accordance with some arrangements of the present disclosure.

FIG. 3 illustrates a cross-sectional view of an electronic module 3 in accordance with some arrangements of the present disclosure. The electronic module 3 of FIG. 3 is similar to the electronic module 1 of FIG. 1, and the differences therebetween are described below.

In some arrangements, as shown in FIG. 3, the receiving part 11 may be disposed on or adjacent to the surface 102 of the substrate 10 and the transmitting part 12 may be disposed on or adjacent to the surface 101 of the substrate 10.

Figure 7:
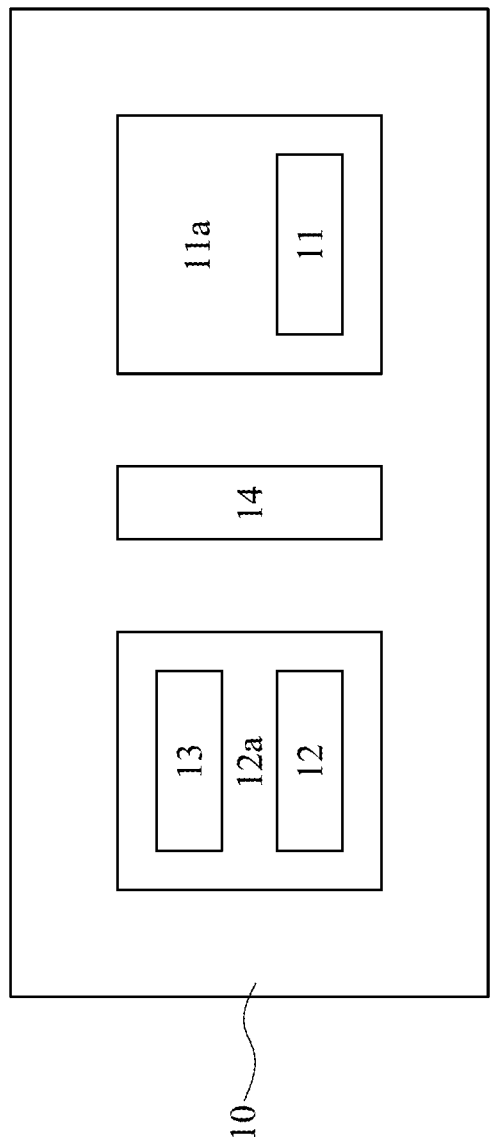
FIG. 7 illustrates a top view of an electronic module in accordance with some arrangements of the present disclosure.

In some arrangements, the antenna part 13 may be disposed on or adjacent to the surface 101 of the substrate 10. In some arrangements, the antenna part 13 and the transmitting part 12 may be disposed on the same side of the substrate 10. In some arrangements, the antenna part 13 and the transmitting part 12 may be integrated. For example, the antenna part 13 and the transmitting part 12 may be integrated on the surface 101 of the substrate 10. For example, the antenna part 13 and the transmitting part 12 may be integrated on (e.g., embedded in, contacting, coupled to, attached to, and so on) the same carrier. For example, as shown in FIG. 7, the antenna part 13 and the transmitting part 12 may be integrated on the same carrier 12a. The carrier 12a may be a part of the substrate 10 or may be a carrier physically separated from the substrate 10.

Figure 4:
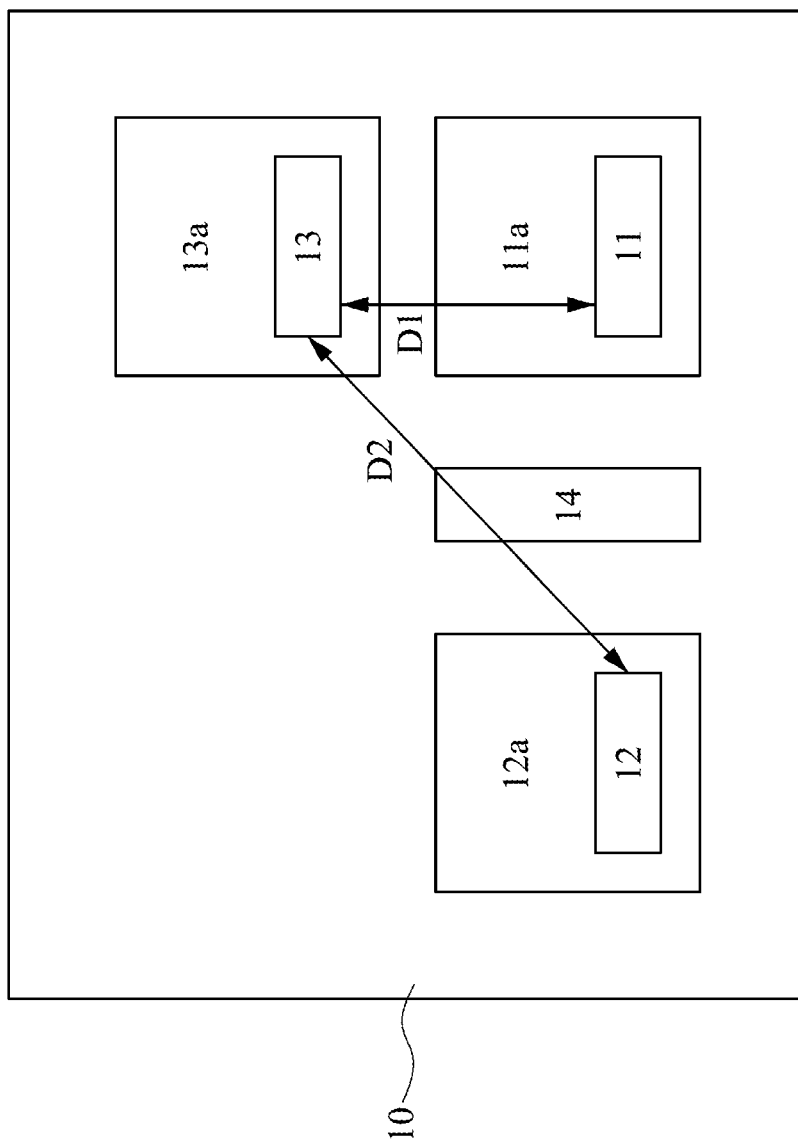
FIG. 4 illustrates a top view of an electronic module in accordance with some arrangements of the present disclosure.

FIG. 4 illustrates a top view of an electronic module in accordance with some arrangements of the present disclosure. In some arrangements, FIG. 4 illustrates a relative locations among the elements in the electronic module 1 of FIG. 1.

In FIG. 4, the receiving part 11 may be disposed on a carrier 11a, the transmitting part 12 may be disposed on a carrier 12a, and the antenna part 13 may be disposed on a carrier 13a. In some arrangements, the carrier 11a, the carrier 12a, and the carrier 13a may be physically spaced apart from one another with a gap therebetween. In some arrangements, the shielding structure 14 may be disposed between the carrier 11a and the carrier 12a.

In some arrangements, the carrier 11a may not directly contact the carrier 12a. In some arrangements, the carrier 11a may not indirectly contact the carrier 12a. In some arrangements, the carrier 11a may be spaced apart from the carrier 12a. In some arrangements, the carrier 11a may be adjacent to the carrier 12a. In some arrangements, a surface of the carrier 11a on which the receiving part 11 is disposed may be adjacent to a surface of the carrier 12a on which the transmitting part 12 is disposed.

In some arrangements, the distance "D1" between the receiving part 11 and the antenna part 13 may be different from the distance "D2" between the transmitting part 12 and the antenna part 13. For example, the distance D2 may be greater than the distance D1. For example, the distance D2 may exceed the distance D1. The distance D1 may be less than the distance D2. The distance D1 may include the shortest distance between the receiving part 11 and the antenna part 13, the distance between two closest points of the receiving part 11 and the antenna part 13, or the distance between the centers of the receiving part 11 and the antenna part 13. The distance D2 may include the shortest distance between the transmitting part 12 and the antenna part 13, the distance between two closest points of the transmitting part 12 and the antenna part 13, or the distance between the centers of the transmitting part 12 and the antenna part 13. In some arrangements, since electromagnetic waves attenuated when passing through mediums (such as air), the energy of the electromagnetic waves received by the antenna (such as the antenna 22 in FIG. 2) may be weak. In some arrangements, by arranging the antenna part 13 close to the receiving part 11, signal loss between the antenna (such as the antenna 22 in FIG. 2) and the receiving part 11 may be alleviated. On the other hand, the transmitting part 12 is configured to conduct electronic signals which is amplified (such as by the PA in FIG. 2), the signal loss between the transmitting part 12 and the antenna part 13 is not as severe as the signal loss between the receiving part 11 and the antenna part 13 is.

In some arrangements, the surface of the carrier 11a on which the receiving part 11 is disposed and the surface of the carrier 12a on which the transmitting part 12 is disposed may face the same direction. For example, the carrier 11a and the carrier 12a may be disposed on the same side of the carrier 11a and the carrier 12a. For example, the surface of the carrier 11a on which the receiving part 11 is disposed and the surface of the carrier 12a on which the transmitting part 12 is disposed may be parallel.

In other arrangements, the surface of the carrier 11a on which the receiving part 11 is disposed and the surface of the carrier 12a on which the transmitting part 12 is disposed may face different directions. For example, the carrier 11a and the carrier 12a may be disposed on different sides of the carrier 11a and the carrier 12a. For example, the surface of the carrier 11a on which the receiving part 11 is disposed may be angled with or non-parallel to the surface of the carrier 12a on which the transmitting part 12 is disposed.

In some arrangements, the carrier 11a may be a part of the substrate 10 in FIG. 1 or may be a carrier physically separated from the substrate 10. In some arrangements, the carrier 12a may be a part of the substrate 10 in FIG. 1 or may be a carrier physically separated from the substrate 10. In some arrangements, the carrier 13a may be a part of the substrate 10 in FIG. 1 or may be a carrier physically separated from the substrate 10. In some arrangements, the carrier 11a and the carrier 12a may be at different circuit layers or different dielectric layers in the substrate 10. For example, the carrier 11a and the carrier 12a may be at different elevations with respect to the surface 102 in the substrate 10. For example, in FIG. 3, the carrier 11a may be or may be at a dielectric layer closer to the surface 102 and the carrier 12a may be or may be at a dielectric layer closer to the surface 101.

FIG. 5 illustrates a top view of an electronic module in accordance with some arrangements of the present disclosure. In some arrangements, FIG. 5 illustrates a relative locations among the elements in the electronic module 1 of FIG. 1. The top view of FIG. 5 is similar to the top view of FIG. 4, and the differences therebetween are described below.

In FIG. 5, the receiving part 11 and the antenna part 13 may be integrated in (e.g., embedded in, contacting, coupled to, attached to, and so on) the same carrier 11a, and the carrier 13a in FIG. 4 is omitted. The carrier 11a may be a part of the substrate 10 in FIG. 1 or may be a carrier physically separated from the substrate 10.

Figure 6:
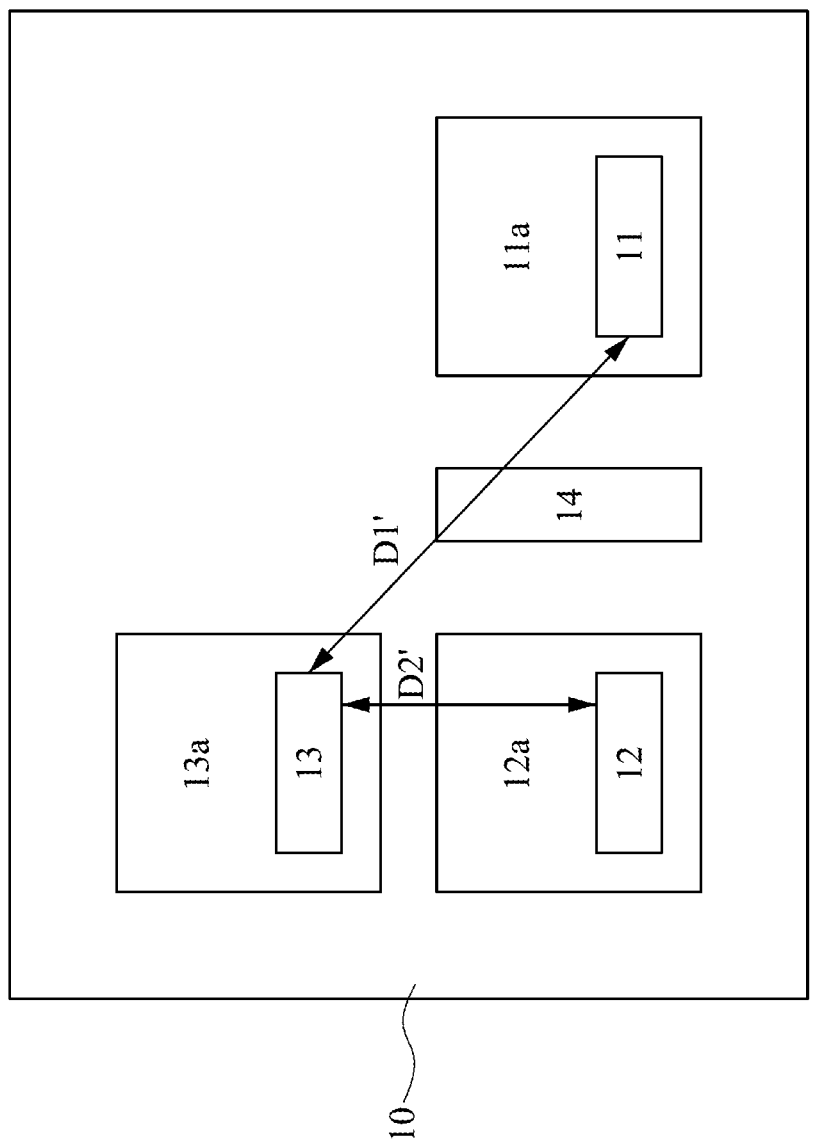
FIG. 6 illustrates a top view of an electronic module in accordance with some arrangements of the present disclosure.

FIG. 6 illustrates a top view of an electronic module in accordance with some arrangements of the present disclosure. In some arrangements, FIG. 6 illustrates a relative locations among the elements in the electronic module 1 of FIG. 1. The top view of FIG. 6 is similar to the top view of FIG. 4, and the differences therebetween are described below.

In FIG. 6, the distance D1' between the receiving part 11 and the antenna part 13 is greater than the distance D2' between the transmitting part 12 and the antenna part 13. For example, the distance D1' may exceed the distance D2'. The distance D2' may be less than the distance D1'. The distance D1' may include the shortest distance between the receiving part 11 and the antenna part 13, the distance between two closest points of the receiving part 11 and the antenna part 13, or the distance between the centers of the receiving part 11 and the antenna part 13. The distance D2' may include the shortest distance between the transmitting part 12 and the antenna part 13, the distance between two closest points of the transmitting part 12 and the antenna part 13, or the distance between the centers of the transmitting part 12 and the antenna part 13

FIG. 7 illustrates a top view of an electronic module in accordance with some arrangements of the present disclosure. In some arrangements, FIG. 7 illustrates a relative locations among the elements in the electronic module 1 of FIG. 1. The top view of FIG. 7 is similar to the top view of FIG. 4, and the differences therebetween are described below.

In FIG. 7, the transmitting part 12 and the antenna part 13 may be integrated in the same carrier 12a, and the carrier 13a in FIG. 4 is omitted. The carrier 12a may be a part of the substrate 10 in FIG. 1 or may be a carrier physically separated from the substrate 10.

FIG. 8 illustrates a cross-sectional view of an electronic module 8 in accordance with some arrangements of the present disclosure. The electronic module 8 of FIG. 8 is similar to the electronic module 1 of FIG. 1, and the differences therebetween are described below.

The electronic module 8 may include the electronic module 1 in FIG. 1, a substrate 80, and a circuit region 81.

The electronic module 1 and the circuit region 81 may be disposed on the substrate 80. The electronic module 1 and the circuit region 81 may be physically separated with a gap (filled by the substrate 80) therebetween. The electronic module 1 and the circuit region 81 may be electrically connected through the substrate 80.

In some arrangements, the circuit region 81 may include the controlling device 15 in FIG. 1. In some arrangements, the circuit region 81 may include the LNA 25 and/or the PA 24 in FIG. 2. In some arrangements, the circuit region 81 may include the transceiver 21 in FIG. 2. In some arrangements, the circuit region 81 may include the controlling device 22 in FIG. 2. In some arrangements, the circuit region 81 may include the controlling device 23 in FIG. 2.

Spatially relative terms, such as "beneath," "below," "lower," "above," "upper," "left," "right" and the like, may be used herein for ease of description to describe one element or feature's relationship to another element(s) or feature(s) as illustrated in the figures. The spatially relative terms are intended to encompass different orientations of the device in use or operation, in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

As used herein, the terms "approximately", "substantially", "substantial" and "about" are used to describe and account for small variations. When used in conduction with an event or circumstance, the terms can refer to instances in which the event or circumstance occurs precisely as well as instances in which the event or circumstance occurs to a close approximation. As used herein with respect to a given value or range, the term "about" generally means within ±10%, ±5%, ±1%, or ±0.5% of the given value or range. Ranges can be expressed herein as from one endpoint to another endpoint or between two endpoints. All ranges disclosed herein are inclusive of the endpoints unless specified otherwise. The term "substantially coplanar" can refer to two surfaces within micrometers (μm) of lying along the same plane, such as within 10 μm, within 5 μm, within 1 μm, or within 0.5 μm of lying along the same plane. When referring to numerical values or characteristics as "substantially" the same, the term can refer to the values lying within ±10%, ±5%, ±1%, or ±0.5% of an average of the values.

The foregoing outlines features of several arrangements and detailed aspects of the present disclosure. The arrangements described in the present disclosure may be readily used as a basis for designing or modifying other processes and structures for carrying out the same or similar purposes and/or achieving the same or similar advantages of the arrangements introduced herein. Such equivalent constructions do not depart from the spirit and scope of the present disclosure, and various changes, substitutions, and alterations may be made without departing from the spirit and scope of the present disclosure.

What is claimed is:

1. An electronic module, comprising:
   a duplexing device including a transmitting part and a receiving part;
   a first carrier having a top surface and a bottom surface, wherein the transmitting part is disposed adjacent to one of the top surface and the bottom surface and the receiving part is disposed adjacent to the other one of the top surface and the bottom surface; and
   an element configured to block electrical interference between the transmitting part and the receiving part;
   a first encapsulant disposed over the top surface of the first carrier and encapsulating the receiving part; and
   a second encapsulant disposed under the bottom surface of the first carrier and encapsulating the transmitting part.

2. The electronic module of claim 1, wherein the element is disposed within the first carrier.

3. The electronic module of claim 2, wherein the element comprises a grounding layer.

4. The electronic module of claim 3, wherein a width of the grounding layer is greater than a width of the receiving part or a width of the transmitting part.

5. The electronic module of claim 1, wherein the transmitting part and the receiving part are overlapped in a direction substantially perpendicular to the top surface of the first carrier.

6. The electronic module of claim 5, wherein the element is overlapped with the transmitting part and the receiving part in the direction.

7. The electronic module of claim 1, wherein the duplexing device further comprises:
   an antenna part electrically connected to the receiving part and the transmitting part,
   wherein the antenna part is disposed closer to the receiving part than to the transmitting part.

8. The electronic module of claim 7, wherein the antenna part is disposed over the top surface of the first carrier and electrically connected to the receiving part and the transmitting part through the first carrier.

9. The electronic module of claim 1, wherein the first encapsulant is disposed between the top surface of the first carrier and the receiver part, and the second encapsulant is disposed between the bottom surface of the first carrier and the transmitting part.

10. The electronic module of claim 1, wherein a lateral surface of the first encapsulant, a lateral surface of the second encapsulant, and a lateral surface of the first carrier are substantially aligned.

11. The electronic module of claim 1, wherein a thickness of the first encapsulant is greater than a thickness of the second encapsulant.

12. The electronic module of claim 1, further comprising:
    a plurality electrical contacts configured to connect the electronic module and an external device,
    wherein the second encapsulant defines a plurality of openings for accommodating the plurality of electrical contacts respectively.

13. The electronic module of claim 12, wherein the transmitting part is disposed between two of the plurality of electrical contacts.

14. The electronic module of claim 12, wherein the duplexing device further comprises an antenna part encapsulated by the first encapsulant and electrically connected to the receiving part and the transmitting part.

15. The electronic module of claim 1, wherein the receiving part is connected to the top surface of the first carrier through a first electrical contact.

16. The electronic module of claim 15, wherein the transmitting part is connected to the bottom surface of the first carrier through a second electrical contact.

17. An electronic module, comprising:
    a duplexing device including a transmitting part and a receiving part;
    a first carrier having a top surface and a bottom surface, wherein the transmitting part is disposed adjacent to one of the top surface and the bottom surface and the receiving part is disposed adjacent to the other one of the top surface and the bottom surface;
    an element configured to block electrical interference between the transmitting part and the receiving part; and
    a controlling device disposed over the first carrier,
    wherein the controlling device is disposed closer to the receiving part than to the transmitting part, and
    wherein the controlling device is configured to control the duplexing device to perform a full duplex operation.

18. The electronic module of claim 17, further comprising:
    an electrical contact disposed under the bottom surface of the first carrier,
    wherein the electrical contact is configured to connect the electronic module and an external device, and
    wherein the electrical contact and the controlling device are at least partially overlapped in a cross-sectional view.

19. An electronic module, comprising:
    a duplexing device including a transmitting part and a receiving part;
    a first carrier having a top surface and a bottom surface, wherein the transmitting part is disposed adjacent to one of the top surface and the bottom surface and the receiving part is disposed adjacent to the other one of the top surface and the bottom surface;
an element configured to block electrical interference between the transmitting part and the receiving part;
a second carrier disposed under the first carrier; and
an antenna disposed over the second carrier and beside the first carrier,
wherein the antenna is electrically connected to the receiving part and the transmitting part through the second carrier and the first carrier.

\* \* \* \* \*